United States Patent
Kawano

(10) Patent No.: US 9,202,125 B2
(45) Date of Patent: Dec. 1, 2015

(54) VIDEO PROCESSING APPARATUS, VIDEO PROCESSING METHOD, AND RECORDING MEDIUM

(71) Applicant: CANON KABUSHIKI KAISHA, Tokyo (JP)

(72) Inventor: Atsushi Kawano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 351 days.

(21) Appl. No.: 13/917,542

(22) Filed: Jun. 13, 2013

(65) Prior Publication Data

US 2014/0003725 A1 Jan. 2, 2014

(30) Foreign Application Priority Data

Jun. 15, 2012 (JP) ................................. 2012-135834

(51) Int. Cl.
G06K 9/46 (2006.01)
G06K 9/32 (2006.01)
G06K 9/00 (2006.01)

(52) U.S. Cl.
CPC .......... *G06K 9/3241* (2013.01); *G06K 9/00362* (2013.01)

(58) Field of Classification Search
None
See application file for complete search history.

(56) References Cited

U.S. PATENT DOCUMENTS

| | | | | |
|---|---|---|---|---|
| 5,963,203 A * | 10/1999 | Goldberg et al. | ............. | 715/723 |
| 6,573,907 B1 * | 6/2003 | Madrane | ....................... | 715/719 |
| 7,433,833 B2 * | 10/2008 | Sako et al. | .................... | 705/27.2 |
| 7,899,705 B2 * | 3/2011 | Fuisz | ......................... | 705/14.55 |

FOREIGN PATENT DOCUMENTS

| | | |
|---|---|---|
| JP | 2009-211311 A | 9/2009 |
| JP | 2011-166243 A | 8/2011 |
| JP | 2012-103752 A | 5/2012 |

* cited by examiner

*Primary Examiner* — Thomas Conway
(74) *Attorney, Agent, or Firm* — Canon U.S.A., Inc. IP Division

(57) ABSTRACT

A video processing apparatus includes: a first detection unit configured to detect a moving object from a movie; a second detection unit configured to detect an object having a predetermined shape from the movie; an extraction unit configured to extract a partial region of a region in which the second detection unit has detected the object having the predetermined shape in the movie; and a discrimination unit configured to discriminate whether the object detected by the second detection unit is a certain object depending on a ratio of a size of an overlapping region to a size of an extracted region extracted by the extraction unit, the overlapping region being a region where a region in which the first detection unit has detected the moving object in the movie and the extracted region overlap with each other.

15 Claims, 8 Drawing Sheets

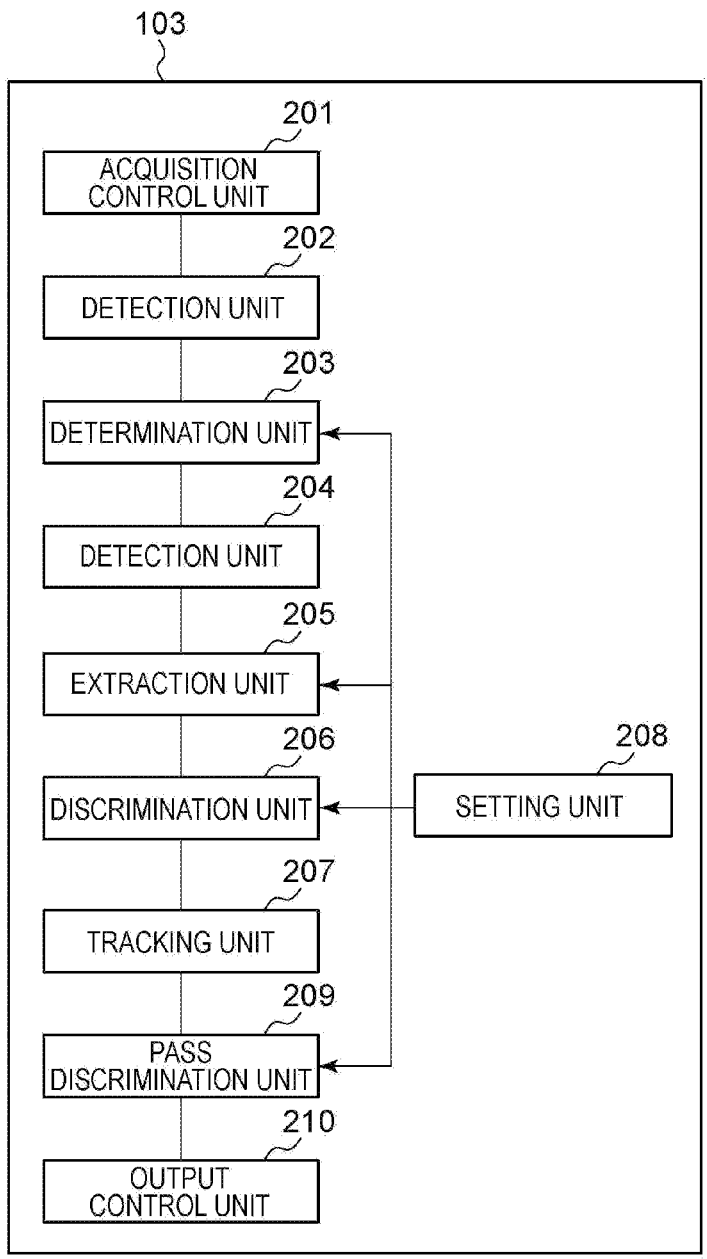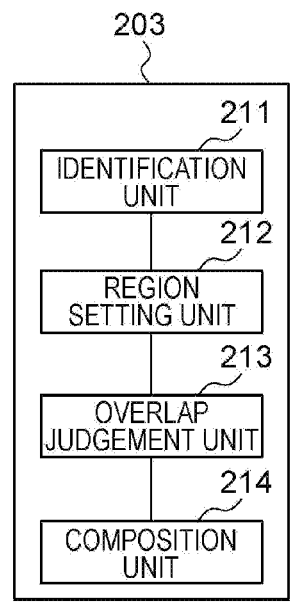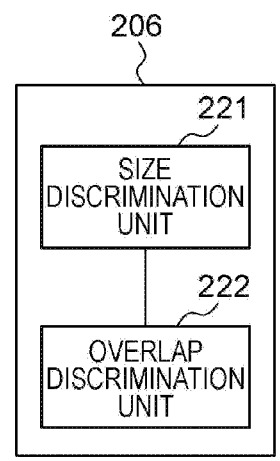

FIG. 7
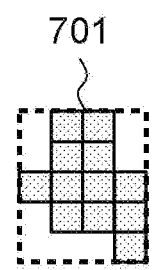
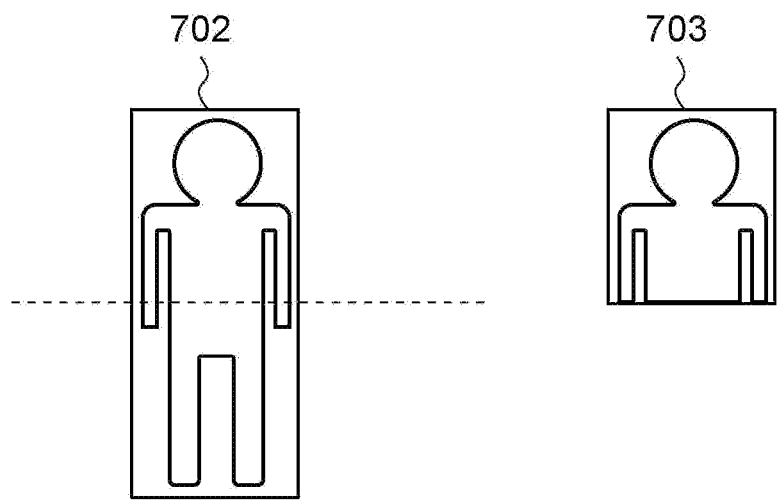

VIDEO PROCESSING APPARATUS, VIDEO PROCESSING METHOD, AND RECORDING MEDIUM

BACKGROUND OF THE INVENTION

1. Field of the Invention

The present invention relates to a video processing apparatus, a video processing method, and a recording medium for detecting a moving object in a video.

2. Description of the Related Art

Conventionally, as a method of detecting a moving object in a movie, a method of detecting a moving object based on a difference between a reference image and a current image is known.

As a method of detecting an object having a certain feature from a movie, a method of comparing an object in a movie with a predetermined pattern, and detecting an object having a high correlation with the pattern from the movie is known.

Japanese Patent Application Laid-Open No. 2011-166243 discloses a monitoring system that detects a moving object from a movie captured by an image capturing apparatus based on a difference between a reference image and a current image, and among a plurality of detected moving bodies, that further detects a moving object satisfying predetermined conditions regarding a size, a moving speed, or the like.

Japanese Patent Application Laid-Open No. 2009-211311 discloses an image processing apparatus that performs detection using a plurality of local feature amounts extracted from a collation pattern upon detection of a human body from an image by collating the collation pattern with a whole image.

According to the conventional method in which only a method of detecting a moving object (referred to as moving object detection, hereinafter) is used, a moving object that is not an actual target of detection may be detected.

According to the conventional method in which only a method of detecting an object having a high correlation with the predetermined pattern (referred to as object detection, hereinafter) is used, a moving object cannot be detected.

In order to solve these problems, moving object detection and object detection are preferably used together, but the following problem arises to realize such a method.

That is, when a moving object having a certain shape exists in a movie, a region in which the moving object is detected by the moving object detection and a region in which the moving object is detected by the object detection do not necessarily match with each other. Therefore, a certain moving object cannot be accurately detected by collating the result of the moving object detection and the result of the object detection.

For example, in the moving object detection, only a moving part of a certain moving object in a movie may be detected.

SUMMARY OF THE INVENTION

A video processing apparatus of the present invention is configured as follows.

That is, a video processing apparatus includes: a first detection unit configured to detect a moving object from a movie; a second detection unit configured to detect an object having a predetermined shape from the movie; an extraction unit configured to extract a partial region of a region in which the second detection unit has detected the object having the predetermined shape in the movie; and a discrimination unit configured to discriminate whether the object detected by the second detection unit is a certain object depending on a ratio of a size of an overlapping region to a size of an extracted region extracted by the extraction unit, the overlapping region being a region where a region in which the first detection unit has detected the moving object in the movie and the extracted region overlap with each other.

Further features of the present invention will become apparent from the following description of exemplary embodiments (with reference to the attached drawings).

BRIEF DESCRIPTION OF THE DRAWINGS

FIGS. 2A, 2B and 2C are diagrams illustrating a configuration of a control unit 103 according to a first embodiment;

FIG. 7 is a view for illustrating a moving object region, an object region and an extracted region.

DESCRIPTION OF THE EMBODIMENTS

Hereinafter, the present invention will be described in detail based on preferred embodiments with reference to the accompanying drawings. Note that the configurations shown in the following embodiments are merely examples, and the present invention is not limited to the illustrated configurations.

First Embodiment

Figure 1:
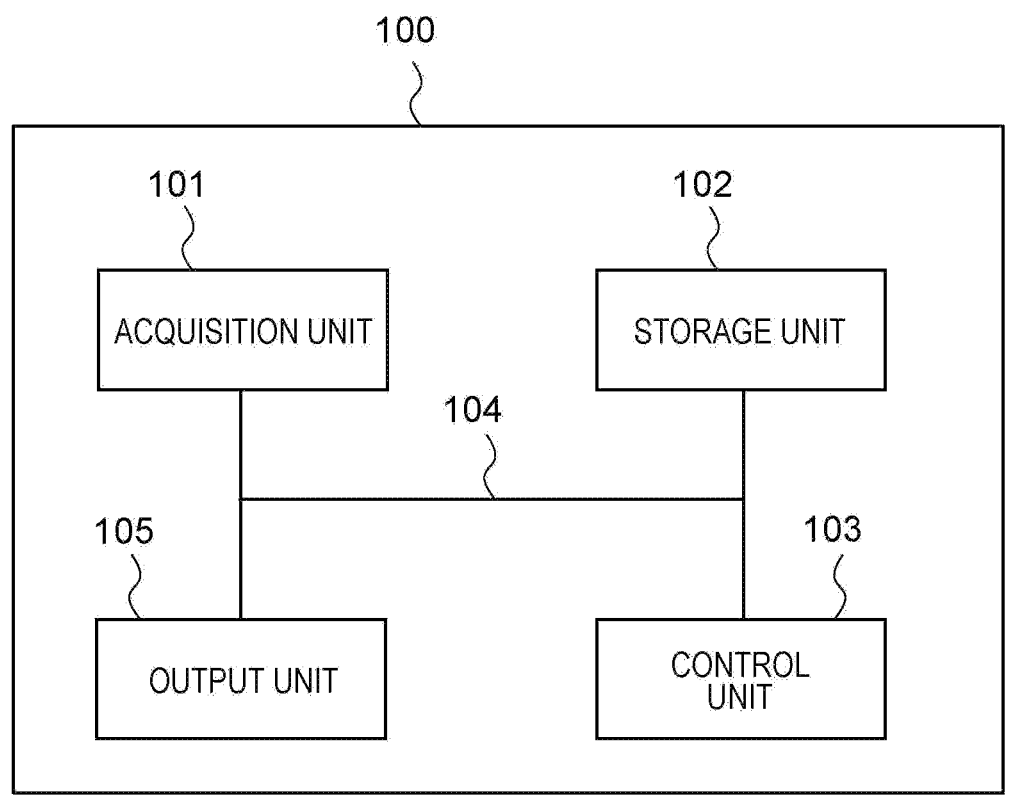
FIG. 1 is a diagram illustrating a configuration of a video processing apparatus.

A configuration of a video processing apparatus 100 according to this embodiment will be described with reference to FIG. 1. An acquisition unit 101 acquires a video from a camera, server, an external memory, or the like.

A storage unit 102 stores the movie acquired by the acquisition unit 101. When a control unit 103 to be described below incorporates a processor such as a Central Processing Unit (CPU), the storage unit 102 stores a program to be executed by the processor. In addition, the storage unit 102 is used to store parameters temporarily that are used upon execution of the program by the processor executes when the control unit 103 incorporates the processor. The storage unit 102 may be configured with a Random Access Memory (RAM), Read Only Memory (ROM), or the like, for example. In addition, an external storage device or a removable medium may be used as the storage unit 102. The storage unit 102 may be configured by a plurality of hardware units. For example, the storage unit 102 may be configured by a temporary storage unit used to store temporary data, an auxiliary storage unit configured to store the program, etc., and the like.

The control unit 103 detects a moving object from a movie acquired by the acquisition unit 101 (first detection). The control unit 103 detects an object that matches with a predetermined pattern from the video acquired by the acquisition unit 101 (second detection). The control unit 103 also identifies a predetermined moving object from the video acquired by the acquisition unit 101 using the moving object detection result and the object detection result. Then, the control unit 103 determines whether the identified moving object has passed over a detection line that is set on the video. The control unit 103 also controls operations of the components of the video processing apparatus 100 according to this embodiment.

An output unit 105 outputs a result of determination by the control unit to an external device. A bus 104 connects the above-described components.

Next, a functional block diagram of the control unit 103 is illustrated in FIG. 2A. When the control unit 103 incorporates a processor, functions respectively illustrated in blocks of FIG. 2A are implemented by the processor executing the program stored in the storage unit 102. Alternatively, a part of or the whole of the functions respectively illustrated in blocks of FIG. 2A may be implemented by individual hardware units.

An acquisition control unit 201 controls the acquisition unit 101 to acquire a video from the outside and controls the storage unit 102 to store the video.

A first detection unit 202 detects a region of a moving object (moving object region) from the video (movie) acquired by the acquisition unit 101. As a method of detecting a moving object in a movie, a background subtraction method can be used, for example, but a method of detecting a moving object is not limited thereto. The detection by the first detection unit 202 can be any detection capable of identifying a position and a size of a moving object in a movie. As a size of a moving object, a height and a width of a circumscribing rectangle of the moving object may be identified. A region of a moving object (moving object region) may be defined as a circumscribed rectangular region of the moving object detected by the first detection unit 202, for example.

A determination unit 203 determines a detection region, in which a process of detecting a predetermined object is performed, on a movie screen image (on a movie) according to the detection result by the first detection unit 202. A functional block diagram of the determination unit 203 is illustrated in FIG. 2B. An identification unit 211 sets a region of the each moving object detected by the first detection unit 202 (circumscribing rectangle). A region setting unit 212 enlarges the region set by the identification unit 211 based on a predetermined set value to create an enlarged region. An overlap judgement unit 213 judges whether a plurality of enlarged regions overlaps with each other. When a plurality of enlarged regions overlaps with each other, a composition unit 214 sets a new enlarged region that covers the enlarged regions (a rectangle covering the plurality of enlarged regions, for example). The detail of a process of determining a detection region performed by the determination unit 203 will be described below with reference to FIGS. 4 and 5.

A second detection unit 204 performs a detection process for detecting a predetermined object in the detection region determined by the determination unit 203. Note that the predetermined object is an object having a certain feature amount in a part or the whole of an object. For example, when a human body is detected, the detection can be performed by judging whether an object has a circular feature corresponding to a head of a human body, and has a feature of a shape corresponding to shoulders of a human body. The object detection process may be performed using a pattern matching process, for example. However, the detection process performed by the second detection unit 204 is not limited to the pattern matching process, and can be can be any detection capable of identifying a position and a size of an object that has a predetermined shape. As a size of an object, a height and a width of a circumscribing rectangle of the detected object may be identified. An object that is detected by the detection process may be a human body, a face, a car, an animal, or the like, for example.

An extraction unit 205 extracts an extracted region from a region of an object detected by the second detection unit 204 in the movie. The region of the object detected by the second detection unit 204 (object region) may be a circumscribed rectangular region of the object detected by the second detection unit 204, for example.

The extracted region used herein is a partial region of the object region in which the second detection unit 204 detects the predetermined object, and is a region used for a discrimination process by a discrimination unit 206 to be described below.

For example, the extracted region may be a region covering a predetermined ratio of the object region. Alternatively, the extracted region may be a rectangular region that is at a predetermined position in the object region and that has a predetermined height. For example, the extracted region may be defined to be a rectangular region that is an upper region of the object region detected by the second detection unit 204 and that has a half height of the object region. That is, when the second detection unit 204 detects a human body, a region representing an upper body of a human body may be the extracted region.

Alternatively, the extracted region may be a part of the detected object that is a part having a predetermined shape (local feature amount) or a circumscribed rectangular region of the part. For example, when the second detection unit 204 detects a human body, a region representing any of a human body part such as a region of a head, a face, face organs, a shoulder, an arm, a chest, and a leg may be defined as an extracted region.

When the second detection unit 204 detects a face, a region representing an eye, a nose, an ear, or the like may be defined as an extracted region. When the second detection unit 204 detects a car, a region representing a license plate, a headlight, a side mirror, or the like may be defined as an extracted region. When the second detection unit 204 detects an animal, a region representing a face, a body, a tail, or the like of an animal may be defined as an extracted region.

The discrimination unit 206 discriminates whether the detection result of the second detection unit 204 is a correct detection or an erroneous detection. FIG. 2C illustrates a functional block diagram of the discrimination unit 206. A size discrimination unit 221 judges whether a size of a certain object detected by the second detection unit 204 is within a size range defined by an object size range value set by a setting unit 208 to be described below. An overlap discrimination unit 222 discriminates whether a ratio of an overlapping region to an extracted region is within a range defined by an overlapping region range value, the extracted region being extracted by the extraction unit 205, and the overlapping region being a region where a region of a moving object detected by the first detection unit 202 and the extracted region overlap with each other. A region of a moving object (moving object region) is a circumscribed rectangular region of a moving object detected by the first detection unit 202, for example. The overlapping region range value is a value set by the setting unit 208 to be described below. The detail of the discrimination process performed by the discrimination unit 206 will be described below with reference to FIG. 6.

Regarding a detected object that has been discriminated as a correctly detected object by the discrimination unit 206, a tracking unit 207 associates the detected object in a first frame image included in a movie with the detected object in a second frame image included in the movie. The tracking unit 207 appends an identical track ID (identifier) to an image of the detected object in the first frame image, and an image of the detected object in the second frame image. In addition, the tracking unit 207 appends a new unique track ID to an object newly detected by the second detection unit 204.

The setting unit 208 sets a region to be extracted by the above-described extraction unit 205 in an object region. For example, a rectangular region that is an upper region of the circumscribed rectangular region of the object region detected by the second detection unit 204 and that has a half height of the circumscribed rectangular region may be set as an extracted region. Alternatively, a region having a certain feature amount in the object region may be set as an extracted region. The way of setting is not limited thereto.

The setting unit 208 sets the object size range value used by the discrimination unit 206 to discriminate whether a size of an object detected by the second detection unit 204 is within a predetermined size range. For example, the setting unit 208 sets maximum values and minimum values of a width and a height of a circumscribing rectangle of a detected object as object size range values.

The setting unit 208 sets an overlapping region range value used by the discrimination unit 206 to perform the above-described discrimination process. The overlapping region range value used herein is a value that defines a range of a ratio of an overlapping region to an extracted region, the extracted region being extracted by the extraction unit 205, and the overlapping region being a region where the extracted region and a region detected by the second detection unit 204 overlap with each other. For example, the overlapping region range value may define a range of a ratio of the overlapping region to the extracted region extracted by the extraction unit 205. For example, the overlapping region range value may be set to be 60% or more and 100% or less of an area of the extracted region. The overlapping region range value may be used to set either one of the maximum value and the minimum value of the ratio of an overlapping region.

In addition, the setting unit 208 sets a detection line used by a pass discrimination unit 209 to be described below to perform pass discrimination.

Each of the set values to be set by the setting unit 208 can be set by an operator who operates the video processing apparatus 100. Alternatively, the setting unit 208 may previously retain the set values.

The pass discrimination unit 209 discriminates whether an object being tracked by the tracking unit 207 has passed over the detection line set by the setting unit 208. The pass discrimination is performed by discriminating whether a trail of the object from a first frame image to a second frame image that is captured later than the first frame image intersects with the detection line where the frame images are included in a movie. The pass discrimination unit 209 may count the number of passes of the object being tracked over the detection line.

An output control unit 210 causes the output unit 105 to output the pass discrimination result by the pass discrimination unit 209.

Figure 3:
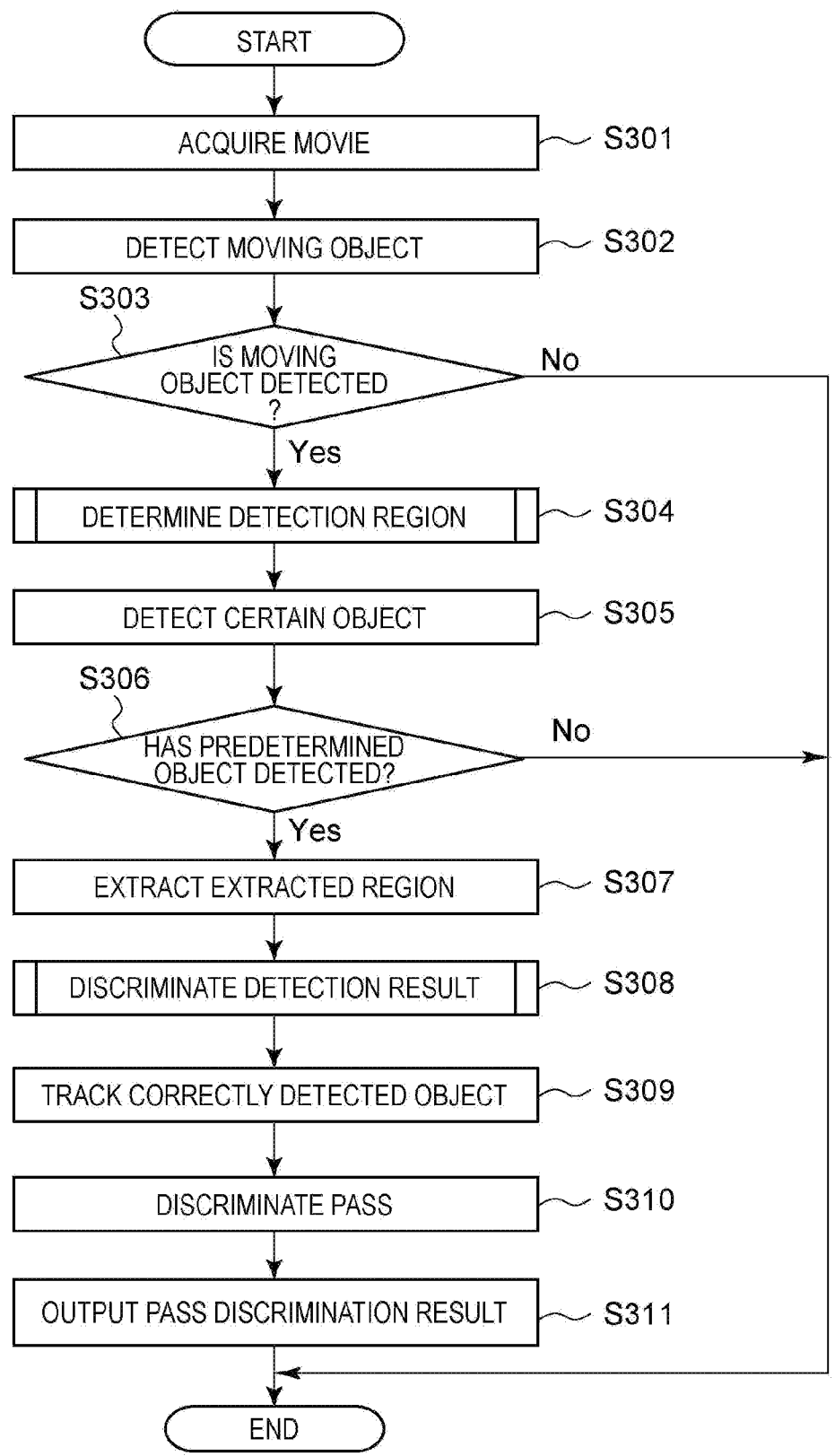
FIG. 3 is a process flow chart of the video processing apparatus according to the first embodiment.

Next, an operation of the video processing apparatus 100 according to this embodiment will be described with reference to FIG. 3. In a case where the control unit 103 incorporates a processor, the process flow of FIG. 3 represents a program that causes the processor to execute procedures illustrated in FIG. 3. The processor incorporated in the control unit 103 may be a computer, and the computer executes a program read out from a memory incorporated in the video processing apparatus 100.

First, the acquisition control unit 201 of the control unit 103 causes the acquisition unit 101 to acquire a movie (S301) (acquisition procedure).

Next, the first detection unit 202 performs a moving object detection process for detecting a moving object in the acquired movie (S302) (first detection procedure). For the moving object detection process, a background subtraction method may be used, for example.

The control unit 103 discriminates whether the first detection unit 202 detects a moving object in the movie (S303). If the first detection unit 202 has not detected any moving object in the movie (No in S303), the control unit 103 ends the process. On the other hand, if the first detection unit 202 has detected a moving object in the movie (Yes in S303), the determination unit 203 determines a detection region in which the second detection unit 204 performs detection out of the region in the movie (S304) (determine procedure).

The detection region is determined based on the result of the moving object detection performed by the first detection unit 202 in step S302. Since the second detection unit 204 limits a region in which detection is performed, a load of the detection process can be reduced. In addition, since the detection region is determined based on the result of the moving object detection, a region in which a subject to be detected likely exists can be determined as the detection region. The detail of the process of determining the detection region will be described below with reference to FIG. 4.

After the determination unit 203 determines the detection region, the second detection unit 204 performs a detection process of detecting a predetermined object in the detection region determined by the determination unit 203 (S305) (second detection procedure). For this detection process, a pattern matching process can be used, for example.

The control unit 103 discriminates whether the second detection unit 204 has detected a predetermined object in the detection region (S306). If the second detection unit 204 has not detected the predetermined object (No in S306), the control unit 103 ends the process. On the other hand, if the second detection unit 204 has detected the predetermined object (Yes in S306), the extraction unit 205 extracts the above-described extracted region from a region of the detected predetermined object (S307) (extraction procedure). For example, when the second detection unit 204 detects a human body, a region representing an upper body of a human body may be the extracted region.

Next, the discrimination unit 206 discriminates whether the detection result of the second detection unit 204 is correct based on the position and the size of the extracted region extracted in step S307, and the position and the size of the moving object detected by the first detection unit 202 (S308) (discrimination procedure). The detail of the discrimination process in step S308 will be described below with reference to FIG. 6.

Next, the tracking unit 207 performs a tracking process of tracking the object that has been detected by the second detection unit 204 in step S308 and that is a detected object that has been discriminated as a correctly detected object by the discrimination unit 206 (S309). That is, the tracking unit 207 performs a process of associating the detected object in the first frame image with the detected object in the second frame image regarding the detected object that has been discriminated as a correctly detected object by the discrimination unit 206, the frame images being included in the movie.

The pass discrimination unit 209 discriminates whether the object being tracked by the tracking unit 207 has passed over the predetermined detection line (S310) (pass discrimination procedure). The output control unit 210 performs a control of outputting the result of determination of the pass discrimination unit 209 from the output unit 105 (S311) (output control procedure). Then, the control unit 103 ends the process.

Figure 4:
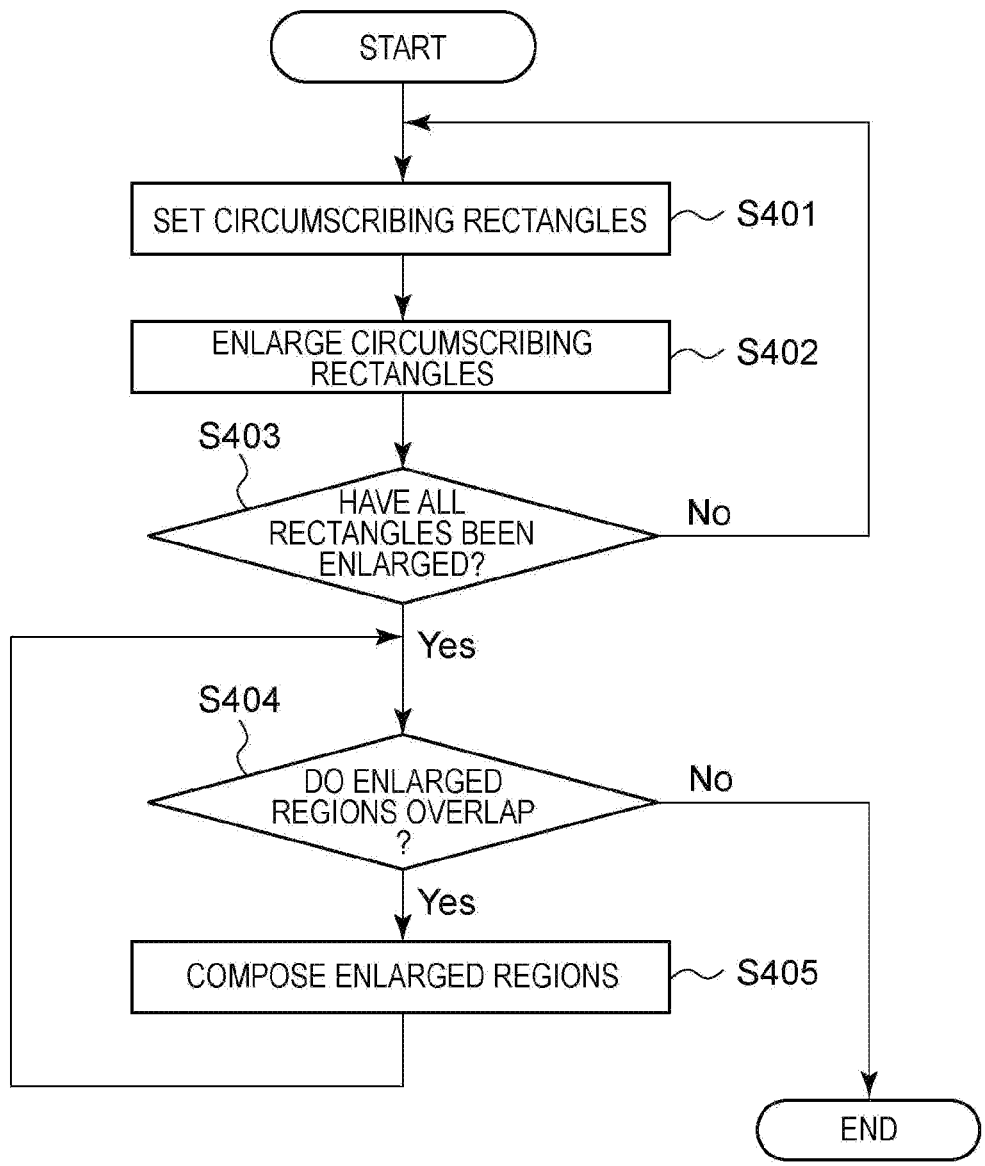
FIG. 4 is a process flow chart of a determination process according to the first embodiment.

Next, a determination process of determining the detection region performed by the determination unit 203 in step S304 will be described with reference to a flow chart of FIG. 4. In a case where the control unit 103 incorporates a processor, the process flow of FIG. 4 represents a program that causes the processor to execute procedures illustrated in FIG. 4. The processor incorporated in the control unit 103 may be a computer, and the computer executes a program read out from a memory incorporated in the video processing apparatus 100.

Figure 5:
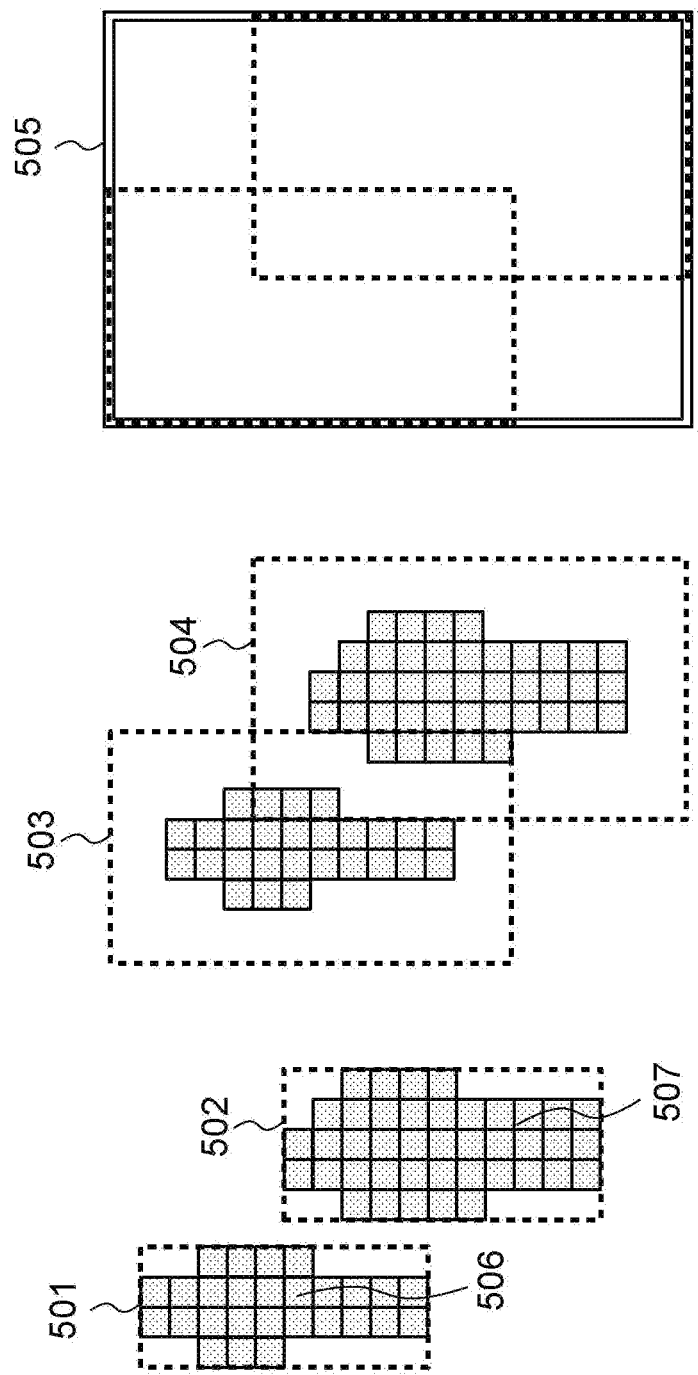
FIG. 5 is a view for illustrating an example of the determination process.

In this embodiment, first, the identification unit 211 of the determination unit 203 sets circumscribing rectangles of the respective moving bodies detected by the first detection unit 202 (S401). FIG. 5 illustrates an example of detection result of the moving bodies. In the example of FIG. 5, a moving object is illustrated as a grouped region of some of sectioned regions that are obtained by sectioning the screen image of the acquired movie into a plurality of regions. Each of the sectioned regions is a minimum unit to detect presence/absence of movement in the movie. Each of the sectioned regions may be one pixel, and may be a region including a plurality of pixels. Colored regions 506, 507 illustrated in FIG. 5 represent moving object regions. Rectangles 501, 502 that circumscribe the regions 506, 507 representing moving bodies are the circumscribing rectangles of the moving bodies.

After the first detection unit 202 sets a circumscribing rectangle of the each detected moving object, the region setting unit 212 of the determination unit 203 subsequently enlarges the set circumscribing rectangles 501, 502, and sets enlarged regions 503, 504 (S402). The region setting unit 212 enlarges the circumscribing rectangles 501, 502 based on an enlarging set value set by the setting unit 208. For example, the enlarging set value may be an enlargement factor used for enlarging a circumscribing rectangle in four vertex directions. The enlarging set value may be a width value by which a circumscribing rectangle is enlarged in four border directions.

Next, the determination unit 203 judges whether the first detection unit 202 has already enlarged circumscribing rectangles for all of the detected moving bodies (S403). If there is a moving object for which a circumscribing rectangle has not yet been enlarged (No in S403), the determination unit 203 repeats the process of steps S401 and S402.

On the other hand, if the determination unit 203 judges that the first detection unit 202 has already enlarged circumscribing rectangles for all of the detected moving bodies (Yes in S403), the determination unit 203 discriminates whether the plurality of enlarged regions overlaps with each other (S404).

If a plurality of enlarged regions overlaps with each other, the composition unit 214 of the determination unit 203 sets a new enlarged region covering their enlarged regions (a rectangle covering the plurality of enlarged regions, for example) (S405). In the example of FIG. 5, the enlarged region 503 and the enlarged region 504 overlap with each other. Therefore, a new enlarged region 505 covering the enlarged regions 503, 504 is formed.

The process of steps S404 and S405 is repeated, and when no enlarged regions overlap with each other, the determination unit 203 ends the process. The determination unit 203 determines thus formed enlarged regions as detection regions in which a human body detection process is performed.

As described above, when a first enlarged region and a second enlarged region overlap with each other, the determination unit 203 determines a region covering the first enlarged region and the second enlarged region as detection regions in which the second detection unit 204 performs detection.

The first enlarged region is a region obtained by enlarging a first region in which the first detection unit 202 detects a first moving object in the movie. The second enlarged region is a region obtained by enlarging a second region in which the first detection unit 202 detects a second moving object in the movie.

Since a region in which the second detection unit 204 performs detection is limited as described above, a load of the detection process can be reduced. In addition, since the detection region is determined based on the result of the moving object detection, a region in which a subject to be detected likely exists can be determined as the detection region.

Figure 6:
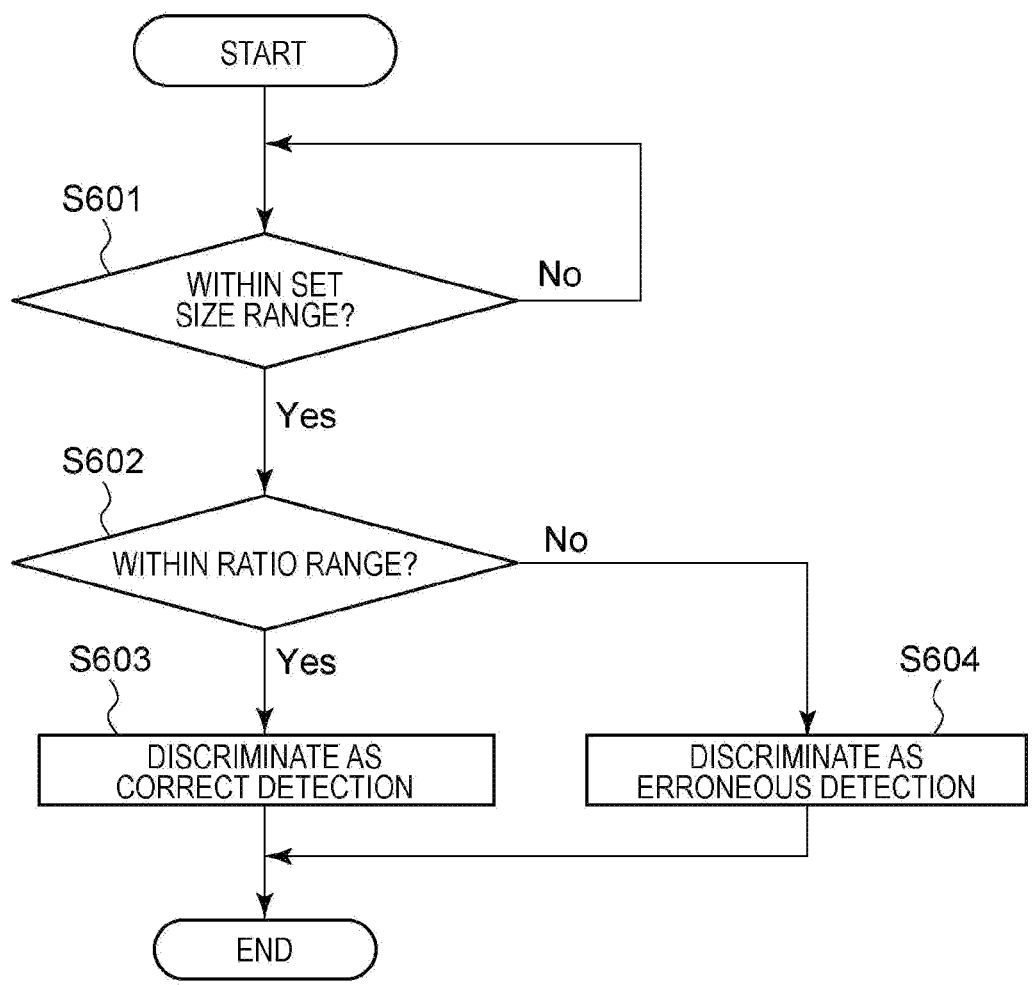
FIG. 6 is a process flow chart of a discrimination process according to the first embodiment.

Next, the discrimination process performed by the discrimination unit 206 in the process of step S308 in FIG. 3 will be described with reference to the flow chart of FIG. 6. In a case where the control unit 103 incorporates a processor, the process flow of FIG. 6 represents a program that causes the processor to execute procedures illustrated in FIG. 6. The processor incorporated in the control unit 103 may be a computer, and the computer executes a program read out from a memory incorporated in the video processing apparatus 100.

First, the size discrimination unit 221 of the discrimination unit 206 judges whether a size of a certain object detected by the second detection unit 204 is within a size range defined by the object size range value set by the setting unit 208 (S601). For example, the size discrimination unit 221 judges whether the width and the height of a circumscribing rectangle of an object detected by the second detection unit 204 is in width and height ranges defined by range values set by the setting unit 208. As described above, only an object having a predetermined size can be detected out of detected objects that have been detected by the second detection unit 204.

If the size of an object detected by the second detection unit 204 is out of the size range defined by the range value (No in S601), the discrimination unit 206 discriminates that the detection is an erroneous detection. On the other hand, if the size of an object detected by the second detection unit 204 is within the size range defined by the range value (Yes in S601), a process of step S602 is performed.

In step S602, the overlap discrimination unit 222 of the discrimination unit 206 discriminates whether a ratio of an overlapping region to an extracted region is within a range defined by the overlapping region range value, the extracted region being extracted by the extraction unit 205, and the overlapping region being a region where the extracted region and a region of a moving object detected by the first detection unit 202 overlap with each other. The way of defining an overlapping region range is not limited to a case where a maximum and a minimum are defined, but overlapping region range value may be defined as a predetermined ratio or more.

The overlapping region will be described next with reference to FIGS. 7 and 8. A moving object region 701 of FIG. 7 represents a region in which the first detection unit 202 has detected a moving object. The moving object region 701 illustrated in FIG. 7 is an example of a detection result when a movement is detected only in an upper body of a human body. For example, in a moving object detection method such as a background subtraction method, whether a moving object is a certain object such as a human body is not considered, only a part of a certain object may be detected as a moving object as the moving object region 701 illustrated in FIG. 7.

An object region 702 represents a region in which the second detection unit 204 has detected a certain object (human body in the example of FIG. 7). An extracted region 703 represents a region that is a part region of the object region 702, and that is extracted by the extraction unit 205. In the example of FIG. 7, the object region 702 is a region illustrated by a circumscribing rectangle of an object detected by the second detection unit 204. The extracted region 703 is a region that is represented by a rectangle having a height of a predetermined ratio of the height of the object region 702 and that is positioned on the upper part of the object region 702. The extracted region 703 in FIG. 7 represents an example where an upper body region of the detected human body is extracted.

Figure 8:
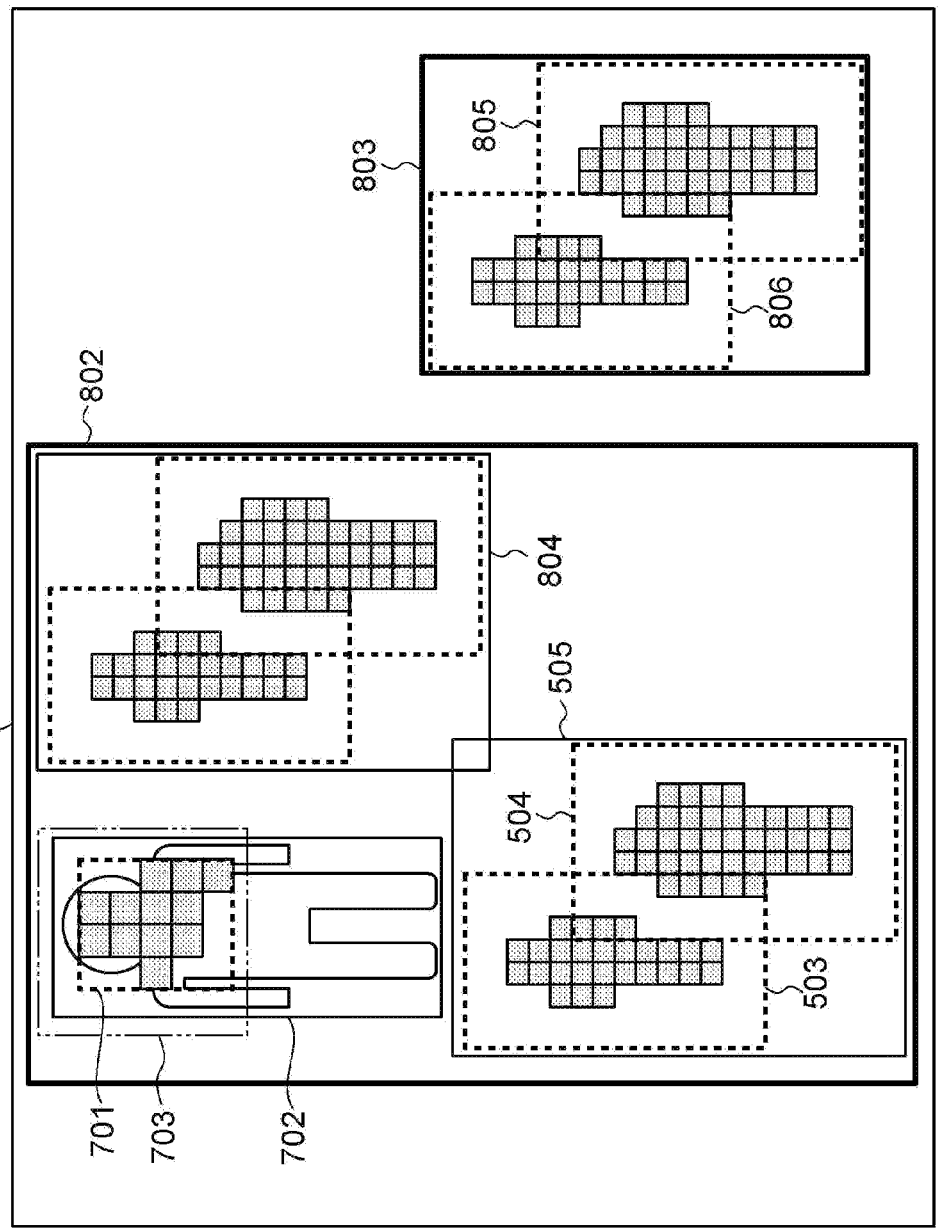
FIG. 8 is a view for illustrating an overlapping region.

A screen image 801 in FIG. 8 illustrates one screen image included in the movie acquired by the acquisition unit 101. A detection region 802 and a detection region 803 represent regions in the screen image 801 determined as described above by the determination unit 203 as regions in which the object detection is to be performed. The detection region 802 is a rectangle covering enlarged regions 505 and 804 that overlap with each other. The enlarged region 505 is a rectangle covering the enlarged regions 503 and 504 that overlap with each other as described with reference to FIG. 5. The detection region 803 is a rectangle covering enlarged regions 805 and 806 that overlap with each other.

FIG. 8 illustrates an example where the moving object region 701 is detected in the detection region 802, and at an identical position, the object region 702 is detected. In this case, a region where the moving object region 701 and the extracted region 703 overlap with each other is an overlapping region. Based on a ratio of the size of this overlapping region to the size of the extracted region 703, it is discriminated whether the detection of the object region 702 is correct detection. For other moving object regions illustrated in FIG. 8, collation with the detected object region is similarly performed. The size of an overlapping region may be defined as an area of the overlapping region, for example. The size of an extracted region may be defined as an area of the extracted region, for example.

With reference to FIG. 8, an example where the moving object region 701 is included in the object region 703 is described. However, their relation is not limited thereto and the moving object region 701 may be beyond the object region 703. For example, when a human body and its shadow are detected as a moving object of one cluster, the moving object region 701 may be beyond the object region 703.

When a ratio of the overlapping region to the extracted region 703 is within a range defined by the overlapping region range values, the detection is judged to be correct detection (S603), and the process is ended. On the other hand, when the ratio of the overlapping region is out of a range defined by the overlapping region range values, the detection is discriminated as erroneous detection (S604), and the process is ended.

Thus, for example, when the ratio of the overlapping region to the extracted region 703 is large, it can be discriminated that the moving object detected by the first detection unit 202 is likely to be a target subject to be detected. On the other hand, when the ratio of the overlapping region to the extracted region is small, it can be discriminated that the moving object detected by the first detection unit 202 is likely not to be a target subject to be detected.

When object detection is performed by either the moving object detection process or the object detection process, a subject to be detected that is not a target may be detected. However, by a method according to this embodiment, a subject to be detected is determined based on the result of comparing the result of the moving object detection process and the result of the object detection process. Therefore, a target object can be detected more accurately.

In addition, in this embodiment, the extracted region 703 that is a part of region extracted from the object region 702 detected by the object detection process is compared with the moving object region 701. Thus, a target object can be detected more accurately.

By the moving object detection, whole of an object of shooting is not necessarily detected depending on a state where the object of shooting is shot. For example, when a human body is detected, there may be cases such as where an upper body part is detected by the first detection unit 202 because of its movement, while a lower body part is not detected by the first detection unit 202 because of its quiescent.

In such a case, the ratio of the overlapping region to the object region 702 (whole human body) is relatively small. Note that the overlapping region is a region where the object region 702 (whole human body) detected by the second detection unit 204 and the moving object region 701 (in a case where only an upper body part is detected) detected by the first detection unit 202 overlap with each other. Thus, the detection may be discriminated as erroneous detection by a method of discriminating detection as correct detection when a ratio of the overlapping region to whole of the object region 702 rather than to the extracted region 703 is a predetermined ratio or more, for example.

On the other hand, according to this embodiment, the extracted region 703 that is an extracted part of the object region 702 detected by the second detection unit 204 and the detected moving object region 701 are compared. Thus, the ratio of the overlapping region to the extracted region 703 (upper body part) that has been extracted by the extraction unit 205 is relatively large. Note that the overlapping region is a region where the extracted region 703 and the moving object region 701 (in a case where only an upper body part is detected) detected by the first detection unit 202 overlap with each other. Therefore, according to this embodiment, even if only a part of an actual object is detected as the moving object region 701, the detection can be discriminated as correct detection.

A region extracted by the extraction unit 205 may be defined to be a region having a shape of a part that is particularly notable among parts of an object as a subject to be detected. For example, a head part may be extracted from whole of a human body. Thus, even when an area of an overlapping region of the moving object region 701 and the extracted region 703 is small, a region of the part of the object as a subject to be detected may be detected as correct detection if a ratio of a moving region in a head is large.

Thus, according to the first embodiment of the present invention, a target moving object can be accurately detected. Therefore, object tracking, pass detection, pass count, and the like can be more accurately performed when the detection result is used for a tracking process, and a pass detection process.

According to the present invention configured as described above, a certain object of shooting can be accurately detected from a movie.

Second Embodiment

In this embodiment, a configuration in which enlarged regions overlapping with each other are respectively determined as detection regions in a process of determining detection regions. A configuration for preventing repeated detection of an identical object of shooting in such a case will be described.

As described in the first embodiment, the second detection unit 204 detects a certain object in a detection region that has been determined by the determination unit 203. When the determination unit 203 sets a first detection region and a second detection region on a movie, a certain object is detected in each of the regions.

Therefore, when the first detection region and the second detection region overlap with each other, if a certain object exists in the overlapping region, the identical object of shooting is repeatedly detected.

For example, when a certain object A exists in the overlapping region, the second detection unit 204 detects the certain object A in the first detection region. In addition, the second detection unit 204 detects the certain object A also in the second detection region.

When each enlarged region is determined as a detection region as described above, an identical object may be repeatedly detected. Therefore, in this embodiment, there is provided a unit configured to judge the repeatedly detected objects as an identical object, whereby an identical object is not repeatedly detected.

A configuration of this embodiment will be described. When enlarged regions overlap with each other, the determination unit 203 in this embodiment does not compose the enlarged regions. When the second detection unit 204 of the video processing apparatus 100 according to this embodiment detects a first object and a second object that are identical object of shooting, a judgement unit included in the second detection unit 204 judges the objects as an identical object. Other than this point, the configuration is identical to that described in the first embodiment, and thus the redundant description thereof will be avoided.

Next, an operation of the video processing apparatus 100 according to this embodiment will be described.

The determination unit 203 of this embodiment does not perform the process of step S404 and the process of step S405 of FIG. 4 in the detection region determination process (S304).

When an identical object of shooting is repeatedly detected in the process of step S305 of FIG. 3, the video processing apparatus 100 according to this embodiment judges them as an identical object. Then, the video processing apparatus 100 detects the object of shooting detected in a first detection region and the object of shooting detected in a second detection region are detected as one object of shooting.

The second detection unit 204 discriminates whether a plurality of determination regions determined by the determination unit 203 overlaps with each other. If it is discriminated that the plurality of determination regions overlaps with each other, the second detection unit 204 discriminates whether an identical object of shooting is detected.

The second detection unit 204 judges a plurality of detection results as an identical object detection if a ratio of an overlapping region of circumscribing rectangles of object regions of the detected plurality of objects is a predetermined ratio or more. That is, the second detection unit 204 judges a ratio of an overlapping region of a circumscribed rectangular region of a certain object that has been detected in the first detection region and a circumscribed rectangular region of a certain object that has been detected in the second detection region. Then, if the ratio of the overlapping region is the predetermined ratio or more, the second detection unit 204 judges that the object detected in the first detection region and the object detected in the second detection region are an identical object.

The judgement whether a plurality of detected objects is an identical object can be made by forming circumscribing rectangles based on positions, widths, and heights thereof on a screen image obtained from the second detection unit 204, and judging whether an overlap rate of the circumscribing rectangles is within a predetermined range. The overlap rate used herein is a ratio of an overlapping region to the circumscribed rectangular region of one of the object regions.

According to this embodiment, it is possible to prevent repeated detection of an identical object of shooting. Therefore, a target object of shooting can be detected more accurately.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-135834, filed Jun. 15, 2012, which is hereby incorporated by reference herein in its entirety.

What is claimed is:

1. A video processing apparatus comprising:
    a first detection unit configured to detect a moving object from a movie;
    a second detection unit configured to detect an object having a predetermined shape from the movie;
    an extraction unit configured to extract a partial region of a region in which the second detection unit has detected the object having the predetermined shape in the movie; and
    a discrimination unit configured to discriminate whether the object detected by the second detection unit is a certain object depending on a ratio of a size of an overlapping region to a size of an extracted region extracted by the extraction unit, the overlapping region being a region where a region in which the first detection unit has detected the moving object in the movie and the extracted region overlap with each other.

2. The video processing apparatus according to claim 1 wherein
    the discrimination unit discriminates that the object, which has the predetermined shape and which has been detected by the second detection unit, as the certain object if the ratio of the size of the overlapping region to the size of the extracted region is a predetermined ratio or more.

3. The video processing apparatus according to claim 1 wherein
the discrimination unit discriminates the object, which has the predetermined shape and which has been detected by the second detection unit, as the certain object if a size of the object, which has the predetermined shape and which has been detected by the second detection unit, is a predetermined size or more and if the ratio of the size of the overlapping region to the size of the extracted region is a predetermined ratio or more.

4. The video processing apparatus according to claim 1 further comprising
a region setting unit configured to set a third region including a first region in which the first detection unit has detected the moving object in the movie and to set a fourth region including a second region in which the first detection unit has detected another moving object in the movie, wherein
the second detection unit detects an object having the predetermined shape in a region covering the third region and the fourth region when the third region and the fourth region overlap with each other.

5. The video processing apparatus according to claim 1 wherein
the movie includes a first frame image and a second frame image, and
the video processing apparatus further comprises a tracking unit configured to associate the object that has been discriminated as the certain object by the discrimination unit in the first frame image and another object that has been discriminated as the certain object by the discrimination unit in the second frame image.

6. The video processing apparatus according to claim 1 wherein
a region in which the first detection unit has detected the moving object is a first region,
a region in which the first detection unit has detected another moving object is a second region,
a region of the movie which includes the first region and in which the second detection unit performs detection is a first detection region,
a region of the movie which includes the second region and in which the second detection unit performs detection is a second detection region,
the second detection unit includes a judgement unit configured to judge the object and the another object that have been detected by the second detection unit as an identical object if the first detection region and the second detection region overlap with each other and if a ratio of an overlapping region of a region of the object that has been detected in the first detection region by the second detection unit and a region of the another object that has been detected in the second detection region by the second detection unit is a predetermined ratio or more where the regions are included in the movie.

7. The video processing apparatus according to claim 1, wherein the extraction unit extracts a region having a size of a predetermined ratio to a size of a region of the movie in which the second detection unit has detected the object having the predetermined shape.

8. The video processing apparatus according to claim 1, wherein the extraction unit extracts a region in which a part of the object that has the predetermined shape and that has been detected by the second detection unit exists.

9. The video processing apparatus according to claim 1, wherein the size of the overlapping region is an area of the overlapping region and the size of the extracted region is an area of the extracted region.

10. A video processing method comprising:
a first detection step of detecting a moving object from a movie;
a second detection step of detecting an object having a predetermined shape from the movie;
an extraction step of extracting a partial region of a region in which the object having the predetermined shape has been detected in the movie in the second detection step; and
an discrimination step of discriminating whether the object detected in the second detection step is a certain object depending on a ratio of a size of an overlapping region to a size of an extracted region extracted in the extraction step, the overlapping region being a region where a region in which the moving object has been detected in the movie in the first detection step and the extracted region overlap with each other.

11. The video processing method according to claim 10 wherein
in the discrimination step, the object, which has the predetermined shape and which has been detected in the second detection step, is discriminated as the certain object if the ratio of the size of the overlapping region to the size of the extracted region is a predetermined ratio or more.

12. The video processing method according to claim 10 wherein
in the discrimination step, the object, which has the predetermined shape and which has been detected in the second detection step, is discriminated as the certain object if a size of the object, which has the predetermined shape and which has been detected in the second detection step is a predetermined size or more and if the ratio of the size of the overlapping region to the size of the extracted region is a predetermined ratio or more.

13. A non-transitory recording medium storing a program for causing a computer to execute:
a first detection procedure of detecting a moving object from a movie;
a second detection procedure of detecting an object having a predetermined shape from the movie;
an extraction procedure of extracting a partial region of a region in which the object having the predetermined shape has been detected in the movie in the second detection procedure;
a discrimination procedure of discriminating whether the object detected in the second detection procedure is a certain object depending on a ratio of a size of an overlapping region to a size of an extracted region extracted in the extraction procedure, the overlapping region being a region where a region in which the moving object has been detected in the movie in the first detection procedure and the extracted region overlap with each other.

14. The recording medium according to claim 13 storing a program for causing the computer to execute
a process of discriminating in the discrimination procedure that the object, which has the predetermined shape and which has been detected in the second detection procedure, as the certain object if the ratio of the size of the overlapping region to the size of the extracted region is a predetermined ratio or more.

15. The recording medium according to claim 13 storing a program for causing the computer to execute a process of discriminating in the discrimination procedure that the object, which has the predetermined shape and which has been detected in the second detection procedure, as the certain object if a size of the object, which has been detected in the second detection procedure, is a predetermined size or more and if the ratio of the size of the overlapping region to the size of the extracted region is a predetermined ratio or more.

* * * * *